PULSE MULTIPLEX SIGNALING SYSTEM

Filed June 28, 1946 2 Sheets-Sheet 1

Inventors
PRAFULLA KUMAR CHATTERJEA
DERMOT MIN AMBROSE
by
R P Morris
Attorney

PULSE MULTIPLEX SIGNALING SYSTEM

Inventors
PRAFULLA KUMAR CHATTERJEA
DERMOT MIN AMBROSE
by
R P Morris
Attorney

Patented Apr. 3, 1951

2,546,974

UNITED STATES PATENT OFFICE 2,546,974

PULSE MULTIPLEX SIGNALING SYSTEM

Prafulla Kumar Chatterjea and Dermot Min Ambrose, London, England, assignors, by mesne assignments, to International Standard Electric Corporation, New York, N. Y., a corporation of Delaware Application June 28, 1946, Serial No. 679,999
In Great Britain May 12, 1945

Section 1, Public Law 690, August 8, 1946
Patent expires May 12, 1965

9 Claims. (Cl. 179—15)

The present invention relates to electric pulse communication systems and is concerned particularly with means by which trains of pulses can be made satisfactorily to carry signals involving frequencies which are close to the pulse repetition frequency.

In speech transmission systems it is usually necessary to provide some means of ringing or otherwise signalling over each channel for the purpose of arranging calls. This is commonly done either by dialling currents or low frequency ringing currents employing frequencies well below the voice frequency range so that very simple separating means are required, or by dialling or ringing currents employing frequencies forming part of the voice frequency range, in which case separation is rather more troublesome, involving various guard devices for preventing false operation of the ringing or dialling means by the voice currents.

Pulse transmission systems permit an entirely different means of transmitting such signalling currents to be used, by which separation is easy and risk of false operation is negligible without the use of any special critically adjusted guard devices. The same method may be used for transmitting other signals besides ringing or dialling signals, such as, for example, telegraph signals, it being understood, of course, that such other signals cannot be transmitted at the same time as the speech signals.

In pulse transmission systems it is generally regarded that the pulse repetition frequency of the train of pulses used to convey speech signals should not be less than about three times the maximum frequency of the band to be transmitted, though a higher multiple such as five times or more is preferable. It has been found, however, that much lower multiples can be used for conveying signals, for example 1½ or 2, provided that the signals are such that the phase relationship of the modulating waves and of the pulses can be controlled and fixed. Thus, for example, as will be explained presently, with a pulse repetitive frequency of 10,000 per second it is possible to transmit a ringing frequency wave of 5,000 cycles per second by time-phase or time-duration modulation of the pulses, and to direct the ringing currents and speech currents each into their respective channels at the receiver by simple filters.

In this specification, the term "time modulation" will be used to include both time-phase and time-duration modulation.

According to the invention, there is provided a transmitting arrangement for an electric pulse communication system, comprising means for generating a train of pulses having a given repetition frequency, means for generating a periodic wave having a frequency related to the given frequency by a ratio expressible by small integers, means for applying the periodic wave to time modulate the train of pulses, the last-mentioned means including means for phasing the periodic wave in a given manner with respect to the pulse train, and means for transmitting the modulated pulse train over a communication medium.

The invention will be described with reference to the accompanying drawings, in which:

Figs. 1 and 2 show an example of a four-channel time modulating pulse communication system in which ringing signals are transmitted over each channel by the method of the invention. Fig. 1 shows the arrangement at the transmitting end and Fig. 2 that at the receiving end.

It will be assumed that time-phase modulation is employed, but the invention is applicable without essential modification to systems employing time-duration modulation.

Figure 1:
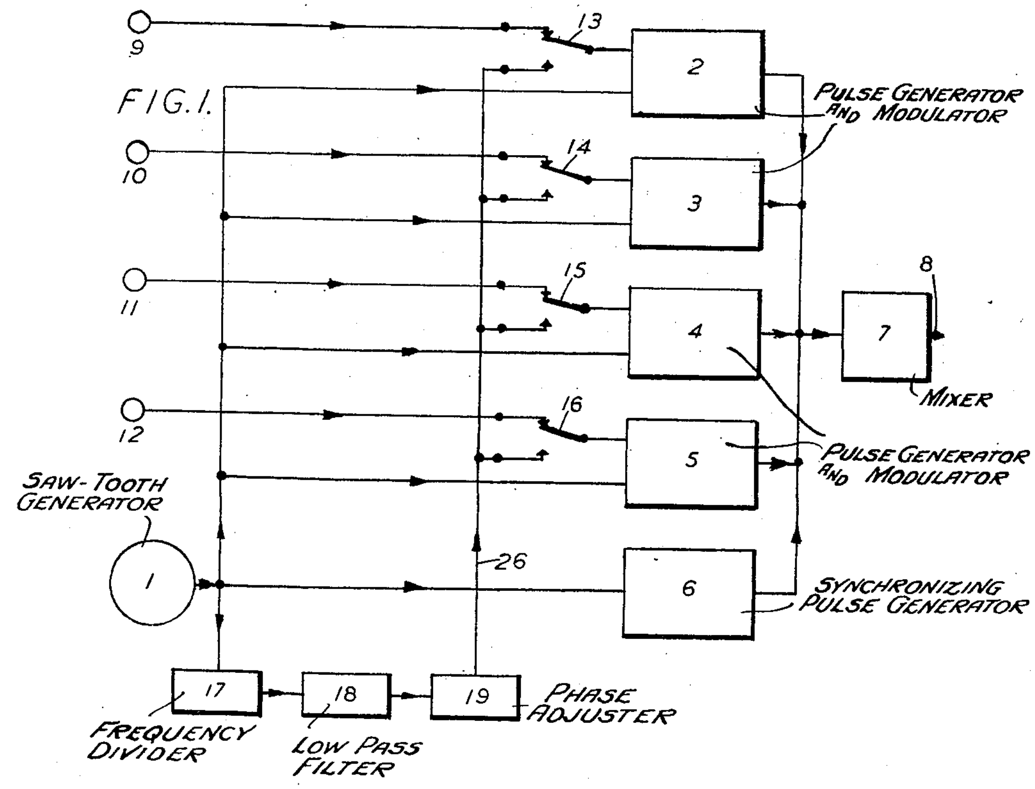
Fig. 1 shows a block schematic diagram of a transmitting arrangement for a multi-channel pulse communication system according to the invention.

Referring to Fig. 1, a master generator 1 supplies saw-tooth waves at a repetition frequency of 10,000 per second, for example, to four channel pulse generators and modulators 2, 3, 4 and 5 and to a synchronising signal or pulse generator 6. The output pulses from these generators are mixed together, amplified and, if necessary, shaped in the unit 7 from which they are sent over a communication medium of any kind at 8.

Individual modulating signals such as speech signals are applied to the pulse modulators 2 to 5 from the terminals 9 to 12 respectively, through change-over switches 13 to 16, respectively.

The units 1 to 7 may be provided in any wellknown way. For example, they may constitute one of the transmitting arrangements described in full detail in British Patent No. 596,658 (complete specification accepted January 8, 1948) and issued April 8, 1948, entitled "Triple Pulse Synchronising System" issued to Standard Telephone and Cables Limited et al.

According to the present invention, a proportion of the output of the generator 1 is supplied to a frequency divider 17 in which saw-tooth or other periodic waves at a frequency of 5,000 cycles per second are derived. These waves are passed through a low pass filter 18 adapted to derive therefrom a substantially pure sine wave at 5,000 cycles per second which is passed through a phase adjusting network 19 and thence to all the lower contacts of the switches 13 to 16. When it is desired to ring over one of the channels, the corresponding switch (14 for example) is operated to substitute the suitably phased sine wave for the normal modulating speech signals. Means is provided at the receiver (which will be described presently) for discriminating the ringing modulation from the normal modulating speech signals and for directing it into a channel separate from that followed by the speech signals, in which separate channel calling means of conventional type is operated.

Figure 3:
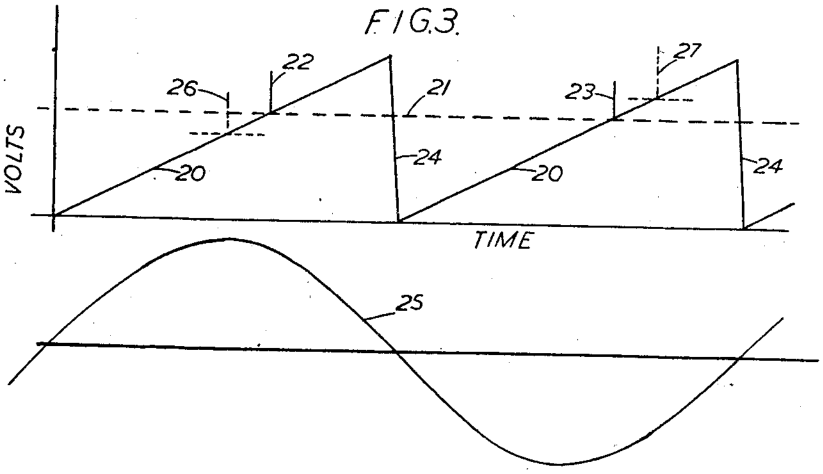
Figs. 3 and 4 show wave form diagrams used to explain the operation of Fig. 1.

Fig. 3 shows a diagram to indicate how the channel pulses are generated in the arrangement of the above-quoted copending specification. The saw-tooth wave voltage applied to the channel pulse generators 2 to 5 from the generator 1 is shown at 20. These waves are applied to fire a grid-controlled gas-filled valve (or to an arrangement which operates in substantially the same way), the time of firing being determined by the bias of the valve. Thus for example, in the case of channel 2 (derived from modulator 3 in Fig. 1), the bias is such that the critical firing potential is represented by the dotted line 21 in Fig. 3. Channel pulses are omitted at the times corresponding to the points where the line 21 cuts the slopes 20 of the saw-tooth waves. Two of these pulses for channel 2 are shown at 22 and 23. It will be understood that for the other channels, the bias is adjusted so that the critical potential occurs at various different levels so that the pulses are omitted at various points along the sloping portions 20 of the saw-tooth waves. These other pulses are not shown in Fig. 3 to avoid complicating the diagram.

Under these conditions, the pulses 22, 23 etc., for channel 2 are equally spaced 100 microseconds apart. The synchronising signals or pulses occur approximately at the times of the fly-back strokes 24 and are not indicated in Fig. 3.

The speech modulation is applied to each channel modulator in the form of a variable bias which in effect varies the level of the line 21. Thus the corresponding valve fires earlier or later than usual so that the channel pulses occur earlier or later. Thus the corresponding pulse train will be time-phase modulated.

According to the present invention, when it is desired to ring over the channel, a sine wave at 5,000 cycles per second is applied instead of the normal modulating speech wave. This sine wave is shown at 25 in Fig. 3, and its phase should be adjusted by means of the network 19 so that the points of zero voltage occur at approximately the same times as the fly-back strokes 24. This will lower the line 21 during the first period shown and will raise it during the second period. The pulse 22 therefore occurs at 26 earlier than usual in the first period, and the pulse 23 occurs at 27 later than usual in the second period. Hence the channel pulses will be consistently early in the odd periods and consistently late in the even periods. Such a pulse train contains a component at 5,000 cycles which can be separated by means of a filter at the receiver.

It will be evident that the amounts by which the pulses are shifted will not be the same for all channels, since this depends on the instantaneous amplitude of the sine wave at the time when the pulse is emitted; pulses corresponding to channels 1 and 4 will be shifted less than those corresponding to channels 2 and 3. The amplitude of the sine wave should be so adjusted that the depth of modulation of any pulse does not exceed the allowable depth for modulation by the normal speech or signals.

It will be evident that the phasing of the wave 25 must be properly adjusted with respect to the phase of the saw-tooth waves, otherwise the zero point might coincide with the pulses of one of the channels so that such pulses would fail to be modulated at all.

While the example of a communication system chosen to illustrate the invention includes four channels, the same principles are applicable to a system having any number of channels, including a single channel system. When there are a large number of channels, for example twelve or more, the amplitude of the sine wave for those one or two channels whose pulses are omitted shortly before or shortly after the fly back strokes may be so small that the depth of modulation produced may be insufficient. In this case a slightly different arrangement of Fig. 1 is preferable. In this modification, the phasing network 19 is omitted, and instead separate phasing networks (not shown) individual to the channel modulators 2 to 5 are introduced between the main conductor 26 and the lower contacts of the switches 13 to 16. Each of those phasing networks may be adjusted so that the maximum amplitude of the sine wave synchronises approximately with the times at which the corresponding shifted pulses are emitted. In this way, all the channel pulse trains will be modulated to substantially the same depth by the sine wave.

It is not essential that the modulating wave should be a sine wave. Other periodic waves having the same fundamental frequency as the sine wave can be used, since only one part in each half wave is employed for each channel. The wave should of course not be of the type having ripples or the like which would cause the omission of more than one pulse in each half wave for each channel. In particular, a simple rectangular wave would be very suitable, as if such a wave were phased so that the up and down strokes synchronised with the fly back strokes of the saw-tooth waves, the pulses of all channels would be equally modulated and individual phasing would not be necessary in the case of a large number of channels.

Figure 2:
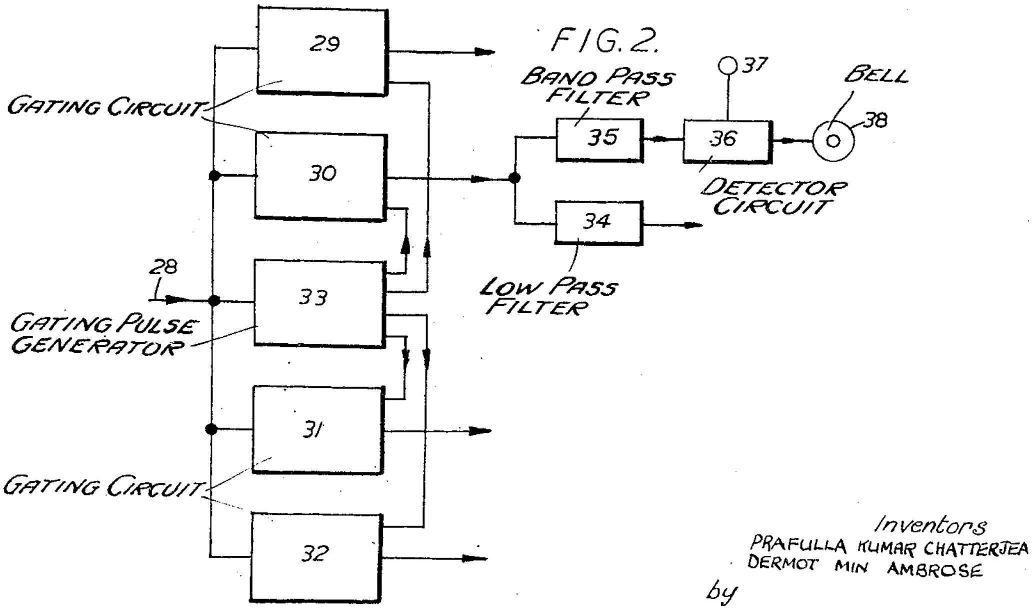
Fig. 2 shows a block schematic diagram of the corresponding receiving arrangement.

Referring now to the receiver Fig. 2, the pulses arrive at 28 from the transmitter and are applied to four gating circuits 29, 30, 31 and 32, and to a gating pulse generator 33 operated by the synchronising pulses or signals. The generator 33 controls the gating circuits by means of pulses in such manner that each is open to accept the pulses of the corresponding channel only when they are due to arrive.

The pulses accepted by each gating circuit are passed to a corresponding demodulating arrangement which may be the same for all the channels. The complete demodulating arrangement is shown only for the gating circuit 30 (channel 2), it being understood that the others may be exactly similar.

The pulses from the gating circuit are applied to a low pass filter 34 which cuts off, for example, at about 3,000 cycles per second, and therefore accepts all frequencies of importance in the voice frequency range. The pulses are also applied to a band-pass filter 35 adapted to accept the 5,000 cycle ringing frequency wave. The normal telephone apparatus (not shown) is connected to the output of the filter 34, and a detector circuit 36 tuned to 5,000 cycles is connected to the output of the filter 35. On receipt of the 5,000 cycle wave, the detector circuit operates a relay which connects ringing current from terminal 37 to a bell or other signal 38.

The circuit of Fig. 2 (apart from the elements 35 to 38) may be one of the arrangements described in detail in the above-mentioned British patent. The filter 34 is the demodulating filter described therein which recovers the speech signals from the corresponding time phase modulated channel pulse train.

It will be understood that the filter 36 excludes the speech signals from the ringing circuit, and when, for example, the switch 14 (Fig. 1) is operated to ring over channel 2, the 5,000 cycle wave is excluded by the filter 34 from the telephone channel the pulses, and will be demodulated by the filter 35; the relay associated with the detector 36 then operates and rings the bell 38.

It will be understood that any convenient arrangement which will operate the bell or signal 38 on receipt of a 5,000 cycle wave can be used for the device 36. For example, a tuned relay might serve as the devices 35 and 36 combined.

It will be understood, also, that the receiver will be provided with a number of gating circuits with demodulating arrangements corresponding to the number of channels in the system, which is not restricted to four channels.

Although it has been assumed for clearness that the pulse repetition frequency for the channel pulses is 10,000 per second, any other convenient frequency can be used. Also it has been assumed that the ringing frequency wave has a frequency half the pulse repetition frequency. Although this is the preferred relation between the frequencies, other ratios expressible by small integers, such as ⅔ or ⅓ could also be used. However, in order that the two types of signal may be capable of separation at the receiver, it is necessary to choose the various frequencies so that $F_c$ is less than F and also less than $F_p-F$ where $F_c$ is the cut-off frequency of the filter 34, $F_p$ is the pulse repetition frequency and F is the frequency of the modulating sine wave, and is equal to $mF_p/n$ where $m$ and $n$ are small integers. In practice there is not likely to be much advantage if $m$ and $n$ exceed 9, so they will usually be single digits.

Figure 4:
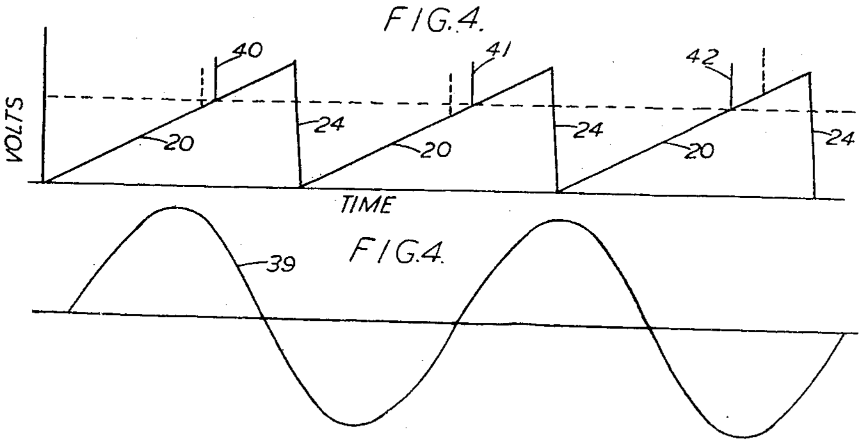

As an example of the choice of a ratio other than ½, Fig. 4 shows diagram similar to Fig. 3 for the case where $F_p=10{,}000$, and $F=6666⅔$, the ratio $m/n$ being equal to ⅔. Three periods of the saw-tooth wave 20, 24 are shown, and two periods of the sine wave 39. The waves are phased so that every third fly back stroke synchronises with a zero value of the wave 39. In this case the first two pulses 40 and 41 are both made to occur earlier than normal while the third pulse 42 is shifted later, all the shifts being different in amount. The same series of shifts will be repeated in every group of three saw-tooth waves. These modulated pulses will contain the frequency 6666⅔ which can be separated out at the receiver by employing say a band filter 35 at the receiver (Fig. 2), adapted to accept this frequency. The arrangements at the receiver are otherwise the same. At the transmitter (Fig. 1), the master oscillator might be arranged to run at 20,000 cycles instead of 10,000 cycles, with a sub-division by two in a circuit (not shown) for supplying the units 2 to 6, the unit 17 providing a subdivision by three.

It is to be noted that various types of signals other than ringing signals may be transmitted in this way. The switches 13 to 16 might, for example, represent the contacts of telephone dials, in which case the unit 36 in Fig. 2 would include the means for receiving dialing impulses. Alternatively, the switches 13 to 16 might be telegraph keys, or contacts of a telegraph machine such as a teleprinter, a suitable receiving relay being included in the unit 36. Such telegraph circuit would, of course, be available only at times when the channels are not in use for speech or other normal signals. Various telephone supervisory signals such as busy signals could evidently be transmitted in the same way. By providing two or more modulating waves of different frequencies related by simple ratios to the pulse repetition frequency, two or more different types of signal could be transmitted, so long as corresponding extra demodulating filters were provided at the receiver in parallel with the filter 35.

It is to be noted that the method of the invention may be used for conveying signals by time modulation of the pulses without the necessity for means being available for modulating the pulses at other times by speech waves or other signals by conventional methods, it being of course understood that signals so conveyed must be of such a nature as to permit rigid control of the phasing of the modulating periodic waves.

What is claimed is:

1. An electric pulse communication system, including means for generating a train of pulses having a given repetition frequency, means for generating a periodic wave having a frequency related to the given frequency by a ratio expressible by small integers, means for applying the periodic wave to said pulse generating means to produce a time modulation of the pulses of said train, the last mentioned means including means for phasing the periodic wave in a given manner with respect to the pulse train, and means for transmitting the modulated pulse train over a communication medium.

2. An electric pulse communication system including means for generating a train of channel pulses having a given repetition frequency, means for applying a signal wave to said pulse generating means for producing a time modulation of the pulses of said train, means for generating a periodic wave having a frequency related to the given frequency by a ratio expressible by small integers, means for adjusting the phase of the periodic wave with respect to the times of occurrence of the pulses of the train when unmodulated, means for applying the phased periodic wave to said pulse generating means to produce a time modulation of the pulses of said train instead of the said signal wave, and means for transmitting the modulated train of pulses over a communication medium.

3. A multi-channel electric pulse communication system including a master generator of periodic waves, means for generating trains of channel pulses having a given pulse repetition frequency, means for generating periodic synchronizing waves, means for applying the output waves from the said master generator to both of said generating means to control the generation of the channel pulse trains and synchronising waves, means for subdividing the frequency of the said output waves by an integer, means for extracting from the frequency subdivided waves the fundamental sinusoidal component thereof, means for applying the said component to a phase changing network, and means for modulating certain of the channel pulse train generating means with the output of said network.

4. An electric pulse communication system comprising a transmitting arrangement including means for generating a train of pulses having a given repetition frequency, means for generating a periodic wave having a frequency related to the given frequency by a ratio expressible by small integers, means for applying the periodic wave to produce a time modulation of the pulses of the train, the last mentioned means including means for phasing the periodic wave in a given manner with respect to the pulse train, and means for transmitting the modulated pulse train over a communication medium, a receiving arrangement, means for applying the modulated pulse train transmitted over the communication medium to the said receiving arrangement, demodulating means in the said receiving arrangement for recovering the said periodic wave, and means in the said receiving arrangement for applying the recovered periodic wave to operate a signal device.

5. An electric pulse communication system comprising means for generating periodic waves, a pulse generator for generating an electric pulse whenever the input voltage applied thereto exceeds a certain amplitude, means coupling the output of said generating means to the input of said pulse generator, means for applying intelligence signals to the input of said pulse generator, means controlled by the output of said generating means for producing a periodic wave having a period related to the period of said generating means output by a ratio expressible by digital integers, means for adjusting the phase of said periodic wave with respect to the output of said generating means, means for applying the phase-adjusted periodic wave to the input of said pulse generator in substitution for said intelligence signals, means for transmitting the output of said pulse generator over a communication medium, means for receiving said output of said pulse generator from said medium, means for recovering said intelligence signals from said received output, means for recovering said periodic wave from said received output, a signal device and means for applying the recovered periodic wave to operate a signal device.

6. A communication system according to claim 5 wherein said means for generating periodic waves comprises a sawtooth wave generator and wherein said pulse generator includes a grid-controlled gas-filled electron discharge device.

7. A multiplex pulse communication system comprising means for generating periodic waves, a plurality of pulse generators each for generating an electric pulse whenever the input voltage applied thereto exceeds a certain amplitude, said amplitude being different for each generator, means for producing synchronizing pulses controlled by the output of said periodic wave generating means, means coupling the output of said generating means to the input of each pulse generator, means for applying intelligence signals to the input of each generator, means controlled by the output of said generating means for producing a periodic wave having a period related to the period of said generating means' output by a ratio expressible by digital integers, means for adjusting the phase of said periodic wave with respect to the output of said generating means, means for applying the phase-adjusted periodic wave to the input of any of said pulse generators in substitution for said intelligence signals, means for combining the outputs of said pulse generators and said synchronizing pulse producing means, means for receiving said outputs, a gating pulse generator controlled by the received synchronizing pulses, a plurality of gating circuits each operated by said gating pulse generator for accepting pulses received from a certain one of said pulse generators, means coupled to said gating circuits for recovering said intelligence signals from the pulse outputs thereof, means for recovering said periodic wave from the pulse outputs of said circuits, signal devices, and means applying the recovered periodic wave to said signal devices.

8. An electrical pulse communication system comprising means for producing a wave of sawtooth pulses having a given repetition frequency, a pulse generator, means for applying said sawtooth pulses to said generator to produce a series of short pulses of the same repetition frequency, each short pulse occurring at a point along the sloping edge of the corresponding sawtooth pulse, means for deriving from said sawtooth wave a periodic wave related to the frequency of said sawtooth wave by a ratio expressible by small integers, and means for applying the periodic wave to said pulse generator to effect a time modulation of the generated short pulses, the last mentioned means including means for phasing the periodic wave with respect to the sawtooth wave so that each peak of the periodic wave occurs within the time of occurrence of the sloping portion of the corresponding sawtooth pulse.

9. An electrical pulse communication system according to claim 8 wherein said means for deriving the periodic wave includes a frequency divider for producing a periodic wave having a frequency equal to half the repetition frequency of the sawtooth wave, and the phasing means has a value such that the peaks of the periodic wave occur at substantially the same time as the occurrence of said point on the sloping portion of the corresponding sawtooth pulse.

PRAFULLA KUMAR CHATTERJEA.
DERMOT MIN AMBROSE.

REFERENCES CITED

The following references are of record in the file of this patent:

UNITED STATES PATENTS

| Number | Name | Date |
|---|---|---|
| 2,007,809 | Nicolson | July 9, 1935 |
| 2,256,336 | Beatty | Sept. 16, 1941 |
| 2,263,369 | Skillman | Nov. 18, 1941 |
| 2,395,467 | Deloraine | Feb. 26, 1946 |
| 2,403,210 | Butement | July 2, 1946 |
| 2,408,077 | Labin | Sept. 24, 1946 |
| 2,418,116 | Grieg | Apr. 1, 1947 |
| 2,429,613 | Deloraine | Oct. 28, 1947 |